(12) United States Patent
Chen et al.

(10) Patent No.: US 6,945,684 B2
(45) Date of Patent: Sep. 20, 2005

(54) THIN BACKLIGHT MODULE

(75) Inventors: Shih-Hsien Chen, Taichung (TW); Kuang-Tao Sung, Fongyuan (TW)

(73) Assignee: Au Optronics Corp., Hsinchu (TW)

( * ) Notice: Subject to any disclaimer, the term of this patent is extended or adjusted under 35 U.S.C. 154(b) by 41 days.

(21) Appl. No.: 10/655,056

(22) Filed: Sep. 4, 2003

(65) Prior Publication Data

US 2004/0257791 A1 Dec. 23, 2004

(30) Foreign Application Priority Data

Jun. 18, 2003 (TW) ........................................ 92116505 A

(51) Int. Cl.⁷ .............................. A47F 3/00; F21V 7/04; G02F 1/1335; H03H 9/00
(52) U.S. Cl. ........................ 362/561; 362/608; 362/560; 362/311; 362/330; 362/331
(58) Field of Search ............................ 362/561, 31, 26, 362/27, 555, 560, 800, 311, 310, 330, 331

(56) References Cited

U.S. PATENT DOCUMENTS

| | | | | |
|---|---|---|---|---|
| 5,886,759 A | * | 3/1999 | Mashino et al. | 349/65 |
| 5,988,827 A | * | 11/1999 | Lee | 362/31 |
| 6,220,741 B1 | * | 4/2001 | Kawachi et al. | 362/561 |
| 6,595,652 B2 | * | 7/2003 | Oda et al. | 362/31 |
| 6,634,761 B2 | * | 10/2003 | Ichikawa | 362/31 |
| 2002/0080298 A1 | * | 6/2002 | Fukuyama | 349/58 |
| 2002/0191131 A1 | * | 12/2002 | Ota et al. | 349/110 |
| 2003/0235052 A1 | * | 12/2003 | Lee et al. | 362/329 |

* cited by examiner

Primary Examiner—Sandra O'Shea
Assistant Examiner—Sharon Payne
(74) Attorney, Agent, or Firm—Thomas, Kayden, Horstemeyer & Risley

(57) ABSTRACT

A thin backlight module is disclosed. The backlight module includes a frame, a light guide plate, and a prism plate. The light guide plate is disposed in the frame, and has a first protrusion and a notch. The prism plate includes a second protrusion and an edge. The prism plate is laid on the light guide plate with the second protrusion and the edge of the prism plate abutting the first protrusion.

27 Claims, 9 Drawing Sheets

THIN BACKLIGHT MODULE

BACKGROUND OF THE INVENTION

1. Field of the Invention

The invention relates to a liquid crystal display unit and a backlight module thereof; in particular, the invention relates to a liquid crystal display module with a thin backlight module.

2. Description of the Related Art

In a liquid crystal display unit of a liquid crystal display, a backlight module is generally utilized as a light source. In the backlight module, a prism plate is assembled with a light guide plate with a pattern design to attain a specified optical property.

FIG. 1a shows conventional assembly method of devices in the backlight module. In the conventional backlight module, optical films may be directly stacked, or adhered to each other by adhesive via separating blocks.

Specifically, in a frame 11 of the conventional backlight module 10, a reflector 12, a light guide plate 13, a diffuser 14, a prism plate 15, and a liquid crystal panel 16 are disposed as shown in FIG. 1a. A flexible printed circuit board 17, connected to the liquid crystal panel 16, is disposed outside the frame 11 and extends to the bottom of the reflector 12.

The conventional backlight module, however, has the following disadvantages.

The geometric shape of the conventional backlight module design is limited. Specifically, reduced thickness and brightness-enhancement of the prism plate are limited due to current manufacturing technology; hence, the thickness of the backlight module exceeds customer requirements, resulting in reduced demand.

An additional drawback of the conventional method is difficulty in positioning the prism plate. As shown in FIG. 1b, in the conventional backlight module, the prism plate 15 is formed with flanges 151 on both sides. It is noted that only one flange 151 is shown in FIG. 1b. The prism plate 15 can be positioned and fixed by means of the flanges 151, simplifying assembly thereof. When the prism plate 15 is deformed or rotated in a Z direction (as illustrated in FIG. 1b), however, there is large variation in brightness between different areas on the same side and lighter and darker pixel zones may occur.

The use of double-sided tape as separating blocks between devices complicates backlight module reworking required by low yield. The double-sided tape may also absorb and diffuse light, hence, the optical quality of the backlight module is unstable.

The prism plate is fixed in the conventional backlight module with flanges on each side. The flanges, however, are not symmetrically positioned, and as a result, the conventional backlight module is subject to thermal and residual stress after temperature testing. Thus, a stripe defect may be generated during operation of the backlight module. The use of flanges further complicates assembly and hinders automatic or semi-automatic mass production of the backlight module.

The flexible printed circuit board 17 is provided with a plurality of electronic devices 171. Thus, the thickness of the entire liquid crystal display unit may be increased due to the higher devices 171.

SUMMARY OF THE INVENTION

In order to address the disadvantages of the aforementioned module, the invention provides a thin liquid crystal display unit.

Another purpose of the invention is to provide a thin backlight module in which optical devices can be correctly positioned according to specifications.

Accordingly, the invention provides a backlight is module including a frame, a light guide plate, and a prism plate. The light guide plate is disposed in the frame, and has a first protrusion and a notch. The prism plate includes a second protrusion. The second protrusion is located in the notch so that the prism plate is positioned on the light guide plate.

In a preferred embodiment, the light guide plate is formed with an inclined surface on the first protrusion, and the prism plate is abutted by the inclined surface.

In another preferred embodiment, the frame is formed with a concave portion, and the light guide plate is formed with a first flange corresponding to the concave portion. The light guide plate is fixed in the frame by the first flange located in the concave portion.

In another preferred embodiment, the prism plate is formed with a plurality of prism patterns, and the second protrusion is formed extending in the same direction as the prism patterns.

In another preferred embodiment, the backlight module further includes a light source. The light source is disposed in the frame, and is abutted by the first protrusion of the light guide plate.

It is understood that the light source may be a light emitting diode.

In another preferred embodiment, the backlight module further includes a diffuser disposed between the prism plate and the light guide plate.

The frame is formed with a concave portion, and the diffuser is formed with a second flange corresponding to the concave portion. The diffuser is fixed in the frame by the second flange located in the concave portion.

In another preferred embodiment, the backlight module further includes a reflector adhered to the light guide plate. The reflector and the prism plate are located at different sides of the light guide plate.

The backlight module further includes double-sided tape. The double-sided tape is disposed between the light guide plate and the reflector, and adheres the reflector to the light guide plate.

In the invention, a liquid crystal display unit is provided. The liquid crystal display unit includes the backlight module and a liquid crystal panel disposed on the backlight module.

In a preferred embodiment, the frame is formed with a step portion at a side that is not adjacent to the light guide plate.

The liquid crystal display unit further includes a flexible printed circuit board. The flexible printed circuit board is connected to the liquid crystal panel, and includes a plurality of electronic devices thereon. Some of the electronic devices are located in the step portion.

The liquid crystal display unit further includes a cushion member disposed between the flexible printed circuit board and the frame.

It is understood that the cushion member may be a sponge.

BRIEF DESCRIPTION OF THE DRAWINGS

The present invention can be more fully understood by reading the subsequent detailed description and examples with references made to the accompanying drawings, wherein:

FIG. 2b is a front view of a backlight module in FIG. 2a;

FIG. 2c is a cross section of the assembled backlight module in FIG. 2a;

FIG. 3a is a side view of a light guide plate in FIG. 2a;

FIG. 3b is a front view of a light guide plate in FIG. 2a;

FIG. 3c is a bottom view of a light guide plate in FIG. 2a;

FIG. 4b is a cross section of the assembled backlight module in FIG. 4a.

DETAILED DESCRIPTION OF THE INVENTION

First Embodiment

Figure 1A:
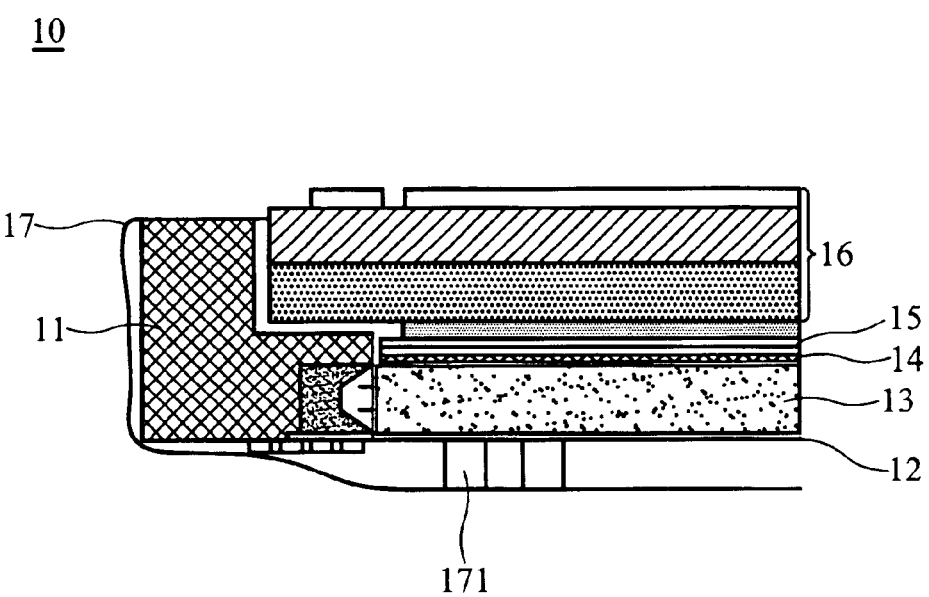
FIG. 1a a cross section of a conventional liquid crystal display unit.
Figure 1B:
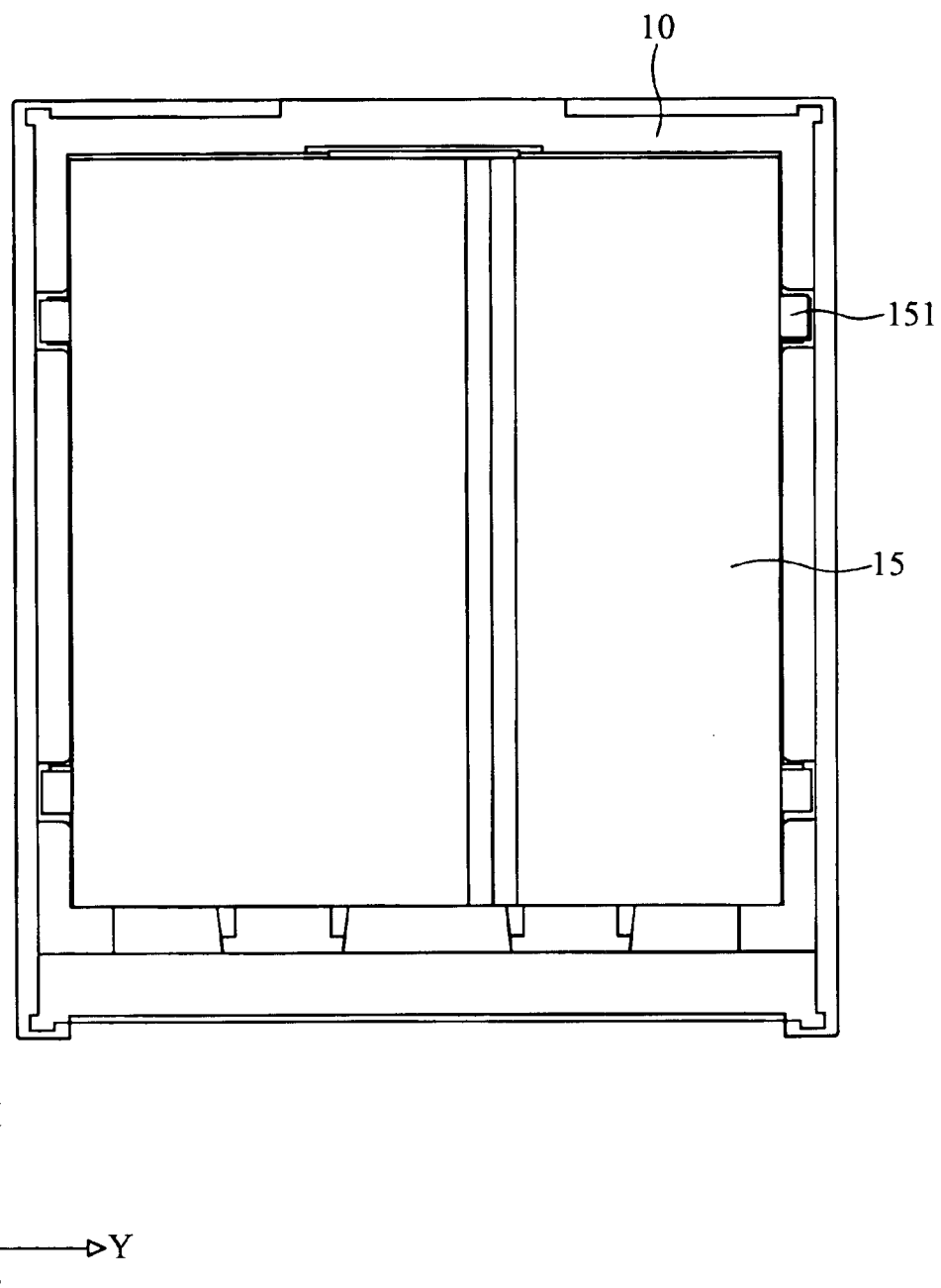
FIG. 1b is a front view of a conventional backlight module.
Figure 2A:
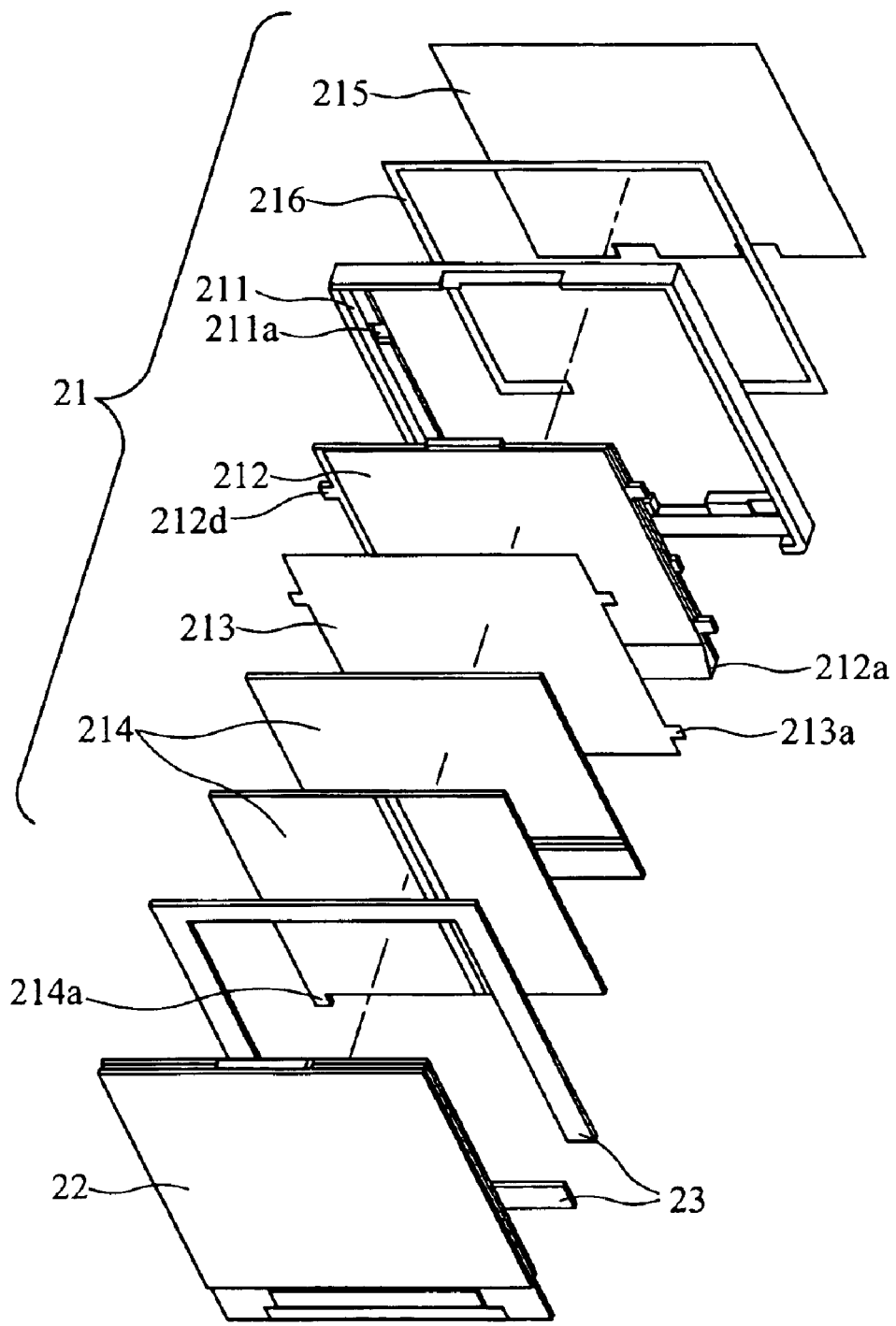
FIG. 2a is an exploded view of a liquid crystal display unit as disclosed in a first embodiment of the invention.
Figure 2B:
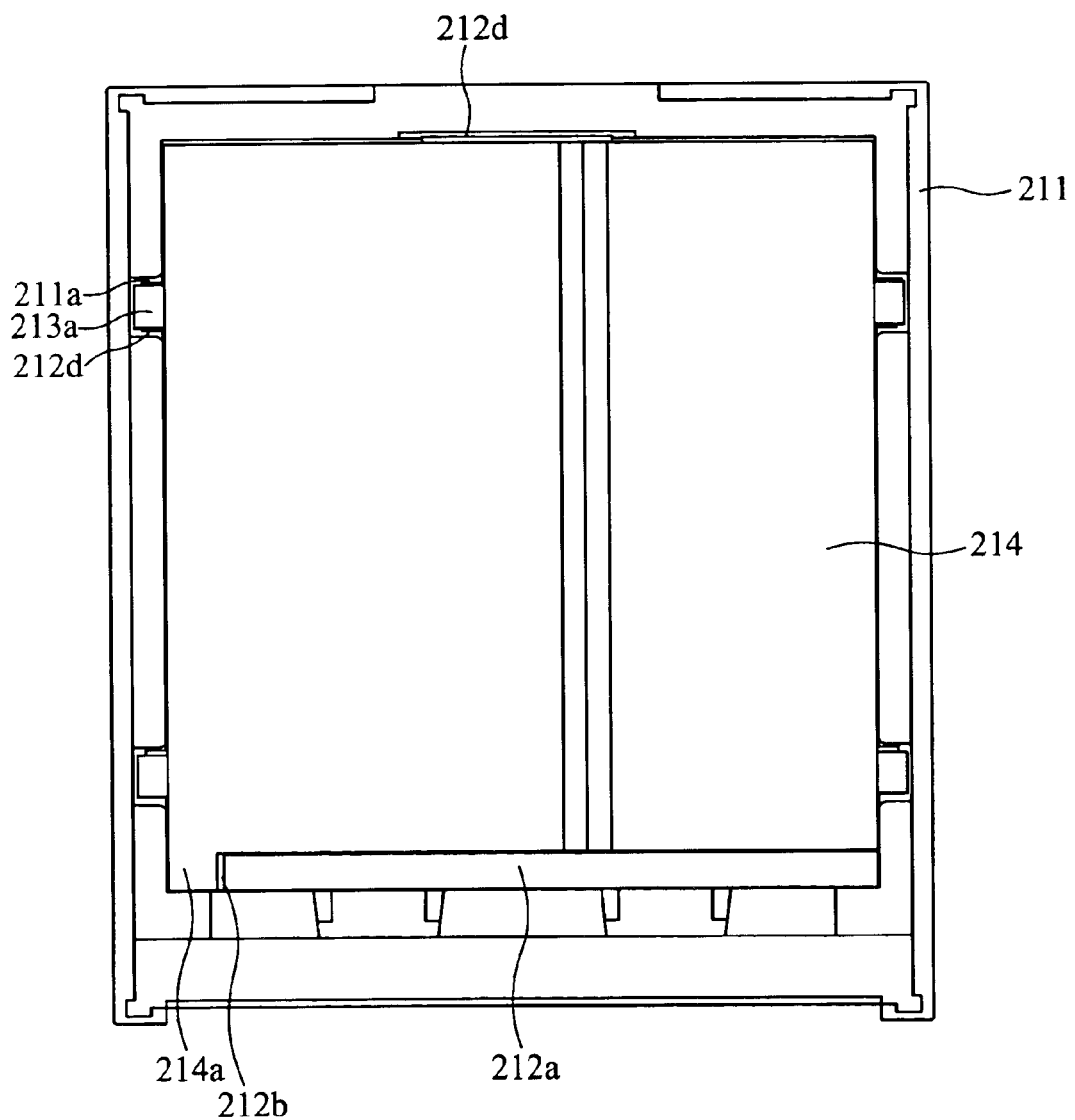

FIG. 2a–2b show a liquid crystal display unit as disclosed in a first embodiment of the invention. In this embodiment, the liquid crystal display unit 20 includes a backlight module 21 and a liquid crystal panel 22. The liquid crystal panel 22 is disposed on the backlight module 21. The backlight module 21 includes a frame 211, a light guide plate 212, a diffuser 213, two prism plates 214, and a reflector 215.

The frame 211, preferably composed of plastic, receives the light guide plate 212. The frame 211 is additionally formed with a plurality of concave portions 211a at the periphery of its inner side. The concave portions 211a retain the light guide plate 212 and the diffuser 213.

Figure 3A:
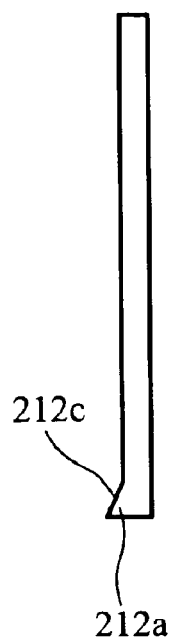
Figure 3B:
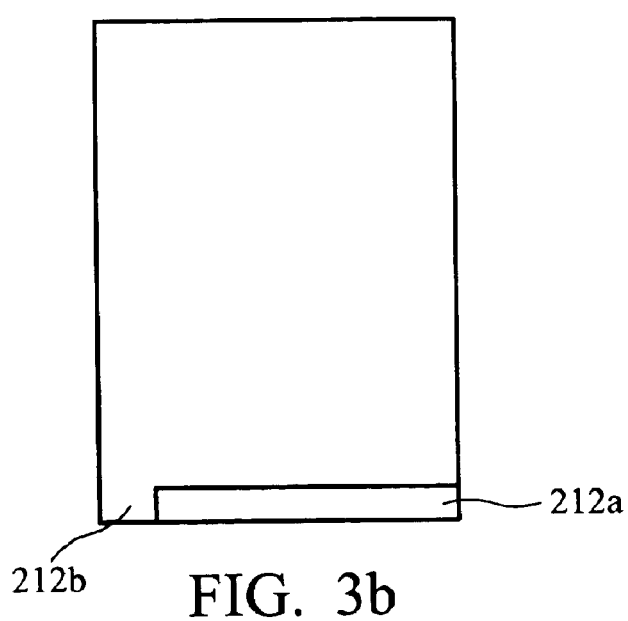
Figure 3C:
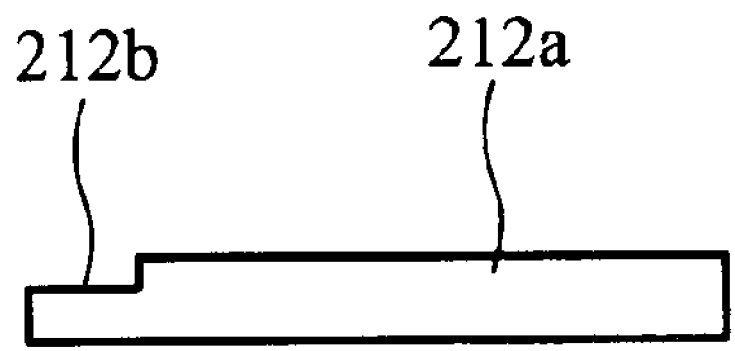

The light guide plate 212 is disposed in the frame 211, and has a first protrusion 212a as shown in FIGS. 3a–3c. Relative to the first protrusion 212a, a notch 212b is formed on the light guide plate 212. The notch 212b retains the prism plate 214, and improves the optical quality thereof. The light guide plate 212 is additionally formed with an inclined surface 212c on the first protrusion 212a, and the prism plate 214 is abutted by the inclined surface 212c. That is, since part of the prism plate 214 can be located on the inclined surface 212c, the thickness of the backlight module 21 can be decreased. The light guide plate 212 is formed with a plurality of first flanges 212d at both sides. The first flanges 212d correspond to the concave portions 211a of the frame 211 respectively. The light guide plate 212 is fixed in the frame 211 by the first flanges 212d being located in the concave portions 211a.

Figure 2C:
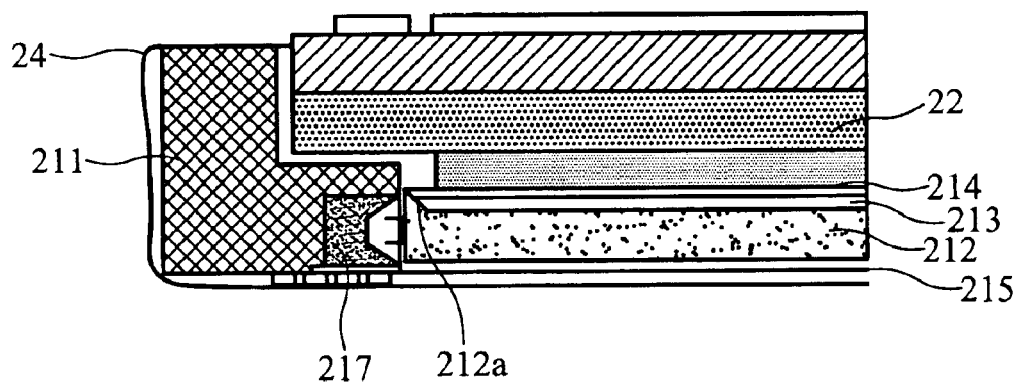

A light source 217 of the backlight module 21 is disposed in the frame 211, and is abutted by the first protrusion 212a of the light guide plate 212 as shown in FIG. 2c. Thus, the light-emitting edge of the light source 217 is adjacent to the planar edge of the light guide plate 212. As a result, the light source 217 can be effectively utilized. Additionally, the height of the inclined surface 212c on the first protrusion 212a in a Z direction is relative to the shape and the effective light-emitting area of the light source 217. The slope of the inclined surface 212c is relative to the size of the notch 212c. In addition, the light source 217 may be a light emitting diode (LED).

The diffuser 213 is disposed between the prism plate 214 and the light guide plate 212, and is formed with a plurality of second flanges 213 corresponding to the concave portions 211a of the frame 211 respectively. The diffuser 213 is fixed in the frame 211 by locating the second flanges 213a in the concave portions 211a.

The prism plates 214 are disposed between the liquid crystal panel 22 and the diffuser 213, and one of the prism plates 214 is formed with a second protrusion 214a. The second protrusion 214a is located in the notch 212b of the light guide plate 212 so that the prism plates 212 can be positioned on the light guide plate 212. Thus, the prism plates 214 differ from conventional prism plates which position the flange at the periphery. In addition, it is noted that the prism plate 214 is formed with a plurality of prism patterns (not labeled) thereon, and the second protrusion 214a is formed extending in the same direction as the prism patterns. Thus, the strength of the prism plate 214 is not reduced due to the formation of the second protrusion 214a, and the optical quality thereof is not diminished.

The reflector 215 is adhered to the light guide plate 212 via double-sided tape 216. That is, the reflector 215 and the prism plate 214 are located at different sides of the light guide plate 212.

In addition, the liquid crystal display unit 20 further includes a light-shielding tape 23 and a flexible printed circuit board 24 as shown in FIG. 2a. The light-shielding tape 23 is disposed between the prism plate 214 and the liquid crystal panel 22. The flexible printed circuit board is disposed outside the frame 211, and is connected to the liquid crystal panel 22.

As stated above, the liquid crystal display unit 20 of this embodiment has the following advantages.

Since the entire liquid crystal display unit is thinner due to the thin backlight module, demand for such units may increase.

In addition, since no flanges are formed on the prism plate, less reworking may be required, resulting in lower costs, and the stress generated by flange formation can be minimized.

The design of the light guide plate and other devices reduces conventional reliance on tape and flanges; hence, the optical quality of the backlight module is not diminished thereby. Additionally, the concentration of the thermal stress can be reduced after temperature testing, thus maintaining optical quality. Finally, since the prism plate is formed without flanges, the backlight module is well suited to automatic mass production, further reducing costs.

Second Embodiment

Figure 4A:
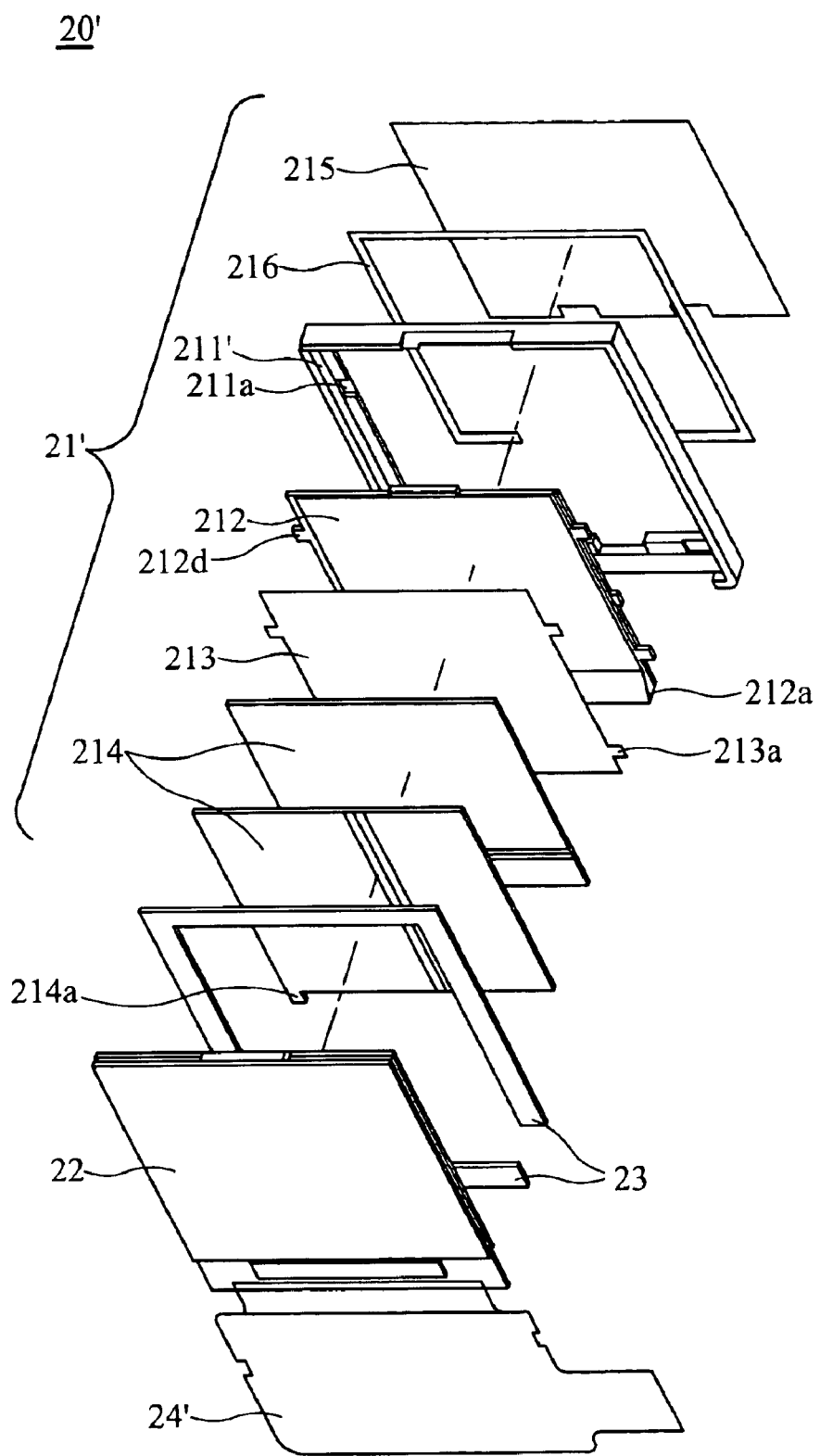
FIG. 4a is an exploded view of a liquid crystal display unit as disclosed in a second embodiment of the invention.
Figure 4B:
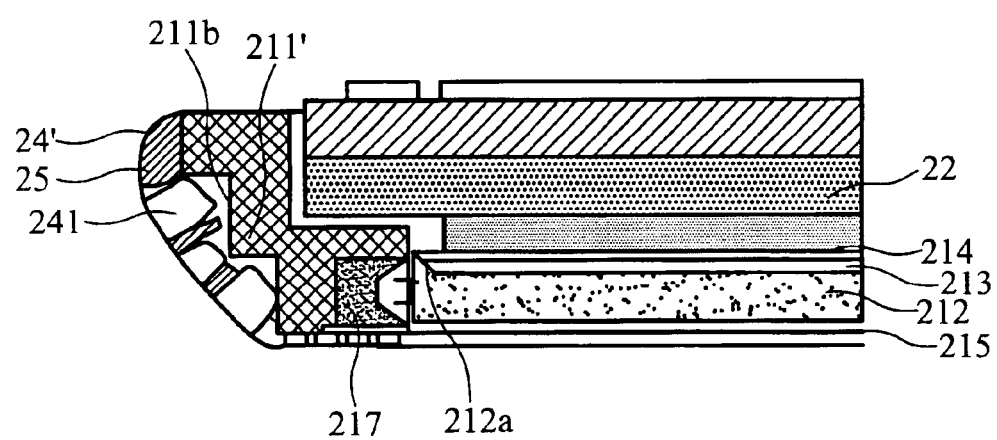

FIGS. 4a and 4b show a liquid crystal display unit as disclosed in a second embodiment of the invention. In this embodiment, the liquid crystal display unit 20' includes a backlight module 21', a liquid crystal panel 22, and a flexible printed circuit board 24'. It is noted that in this embodiment, the devices same as those in the first embodiment are labeled by the same references, and their description is omitted.

The difference between this embodiment and the first embodiment is described in the following. The frame 211' of the backlight module 21' is formed with a step portion 211b at its outer side that is not adjacent to the light guide plate 212. Thus, some of the electronic devices 241, with greater height, on the flexible printed circuit board 24 are disposed in the step portion 211b. Thus, the entire liquid crystal display unit 20' achieves a thinner profile.

The liquid crystal display unit 20' further includes a cushion member 25 disposed between the flexible printed circuit board 24' and the frame 211'. Thus, the devices 241 are protected from potential damage by the frame 211' caused by external force during the falling and vibration/ shock test of the liquid crystal display unit 20'. It is understood that the cushion member 25 may be a sponge.

Since the backlight module of this embodiment is the same as that of the first embodiment, the advantages of the first embodiment can also be attained in this embodiment. In addition, since devices with greater height on the flexible printed circuit board are disposed in the step portion of the frame, the entire liquid crystal display unit achieves a thinner profile.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module comprising:
   a frame;
   a light guide plate, disposed in the frame, having a first protrusion oriented lengthwise along an edge thereof; and
   a prism plate including a second protrusion protruding from an edge thereof, wherein the prism plate is laid on the light guide plate with the second protrusion and the edge of the prism plate abutting the first protrusion.

2. The backlight module as claimed in claim 1, wherein the light guide plate is formed with an inclined surface on the first protrusion, and the prism plate is abutted by the inclined surface.

3. The backlight module as claimed in claim 1, wherein the frame is formed with a concave portion, and the light guide plate is formed with a first flange corresponding to the concave portion, and the light guide plate is fixed in the frame by locating the first flange in the concave portion.

4. The backlight module as claimed in claim 1, wherein the the second protrusion protrudes from the edge of the prism plate.

5. The backlight module as claimed in claim 1, further comprising:
   a light source disposed in the frame and abutted by the first protrusion of the light guide plate.

6. The backlight module as claimed in claim 5, wherein the light source is a light emitting diode.

7. The backlight module as claimed in claim 1, further comprising: a diffuser disposed between the prism plate and the light guide plate.

8. The backlight module as claimed in claim 7, wherein the frame is formed with a concave portion, and the diffuser is formed with a second flange corresponding to the concave portion, and the diffuser is fixed in the frame by the second flange located in the concave portion.

9. The backlight module as claimed in claim 1, further comprising:
   a reflector adhered to the light guide plate, wherein the reflector and the prism plate are located at different sides of the light guide plate.

10. The backlight module as claimed in claim 9, further comprising:
    double-sided tape, disposed between the light guide plate and the reflector, for adhering the reflector to the light guide plate.

11. A liquid crystal display unit comprising:
    a backlight module; and
    a liquid crystal panel disposed on the backlight module;
    wherein the backlight module comprises:
    a frame in which the liquid crystal panel is disposed;
    a light guide plate, disposed in the frame, having a first protrusion oriented lengthwise alone an edge thereof; and
    a prism plate, disposed between the liquid crystal panel and the light guide plate, including a second protrusion protruding from an edge thereof, wherein the prism plate is laid on the light guide plate with the second protrusion and the edge of the prism plate abutting the first protrusion.

12. The liquid crystal display unit as claimed in claim 11, wherein the frame is formed with a step portion at a side that is not adjacent to the light guide plate.

13. The liquid crystal display unit as claimed in claim 12, further comprising:
    a flexible printed circuit board, connected to the liquid crystal panel, including a plurality of electronic devices thereon, wherein some of the electronic devices are located in the step portion.

14. The liquid crystal display unit as claimed in claim 13, further comprising:
    a cushion member disposed between the flexible printed circuit board and the frame.

15. The liquid crystal display unit as claimed in claim 14, wherein the cushion member is a sponge.

16. The liquid crystal display unit as claimed in claim 11, wherein the light guide plate is formed with an inclined surface on the first protrusion, and the prism plate is abutted by the inclined surface.

17. The liquid crystal display unit as claimed in claim 11, wherein the frame is formed with a concave portion, and the light guide plate is formed with a first flange corresponding to the concave portion, and the light guide plate is fixed in the frame by the first flange located in the concave portion.

18. The liquid crystal display unit as claimed in claim 11, wherein the second protrusion protrudes from the edge of the prism plate.

19. The liquid crystal display unit as claimed in claim 11, wherein the backlight module further comprises:
    a light source disposed in the frame and abutted by the first protrusion of the light guide plate.

20. The liquid crystal display unit as claimed in claim 19, wherein the light source is a light emitting diode.

21. The liquid crystal display unit as claimed in claim 11, wherein the backlight module further comprises:
    a diffuser disposed between the prism plate and the light guide plate.

22. The liquid crystal display unit as claimed in claim 21, wherein the frame is formed with a concave portion, and the diffuser is formed with a second flange corresponding to the concave portion, and the diffuser is fixed in the frame by locating the second flange in the concave portion.

23. The liquid crystal display unit as claimed in claim 11, wherein the backlight module further comprises:
    a reflector adhered to the light guide plate, wherein the reflector and the prism plate are located at different sides of the light guide plate.

24. The liquid crystal display unit as claimed in claim 23, wherein the backlight module further comprises:
    double-sided tape, disposed between the light guide plate and the reflector, for adhering the reflector to the light guide plate.

25. The liquid crystal display unit as claimed in claim 11, further comprising:

a light-shielding tape, disposed between the prism plate and the liquid crystal panel.

26. A backlight module comprising:

a frame;

a light guide plate, disposed in the frame, having a first protrusion and a notch;

a prism plate including a second protrusion, wherein the second protrusion is located in the notch so that the prism plate is positioned on the light guide plate; and a light source disposed in the frame and abutted by the first protrusion of the light guide plate.

27. A liquid crystal display unit comprising:

a backlight module; and a liquid crystal panel disposed on the backlight module;

wherein the backlight module comprises:

a frame in which the liquid crystal panel is disposed;

a light guide plate, disposed in the frame, having a first protrusion and a notch;

a prism plate, disposed between the liquid crystal panel and the light guide plate, including a second protrusion, wherein the second protrusion is located in the notch so that the prism plate is positioned on the light guide plate; and a flexible printed circuit board, connected to the liquid crystal panel, including a plurality of electronic devices thereon;

wherein the frame is formed with a step portion at a side that is not adjacent to the light guide plate; and wherein some of the electronic devices are located in the step portion.

* * * * *